(12) United States Patent
Gaertner et al.

(10) Patent No.: US 7,465,337 B2
(45) Date of Patent: Dec. 16, 2008

(54) INTERNAL COMBUSTION ENGINE WITH AN AIR SEPARATOR AND METHODS FOR REALIZING SUCH AN INTERNAL COMBUSTION ENGINE

(75) Inventors: Uwe Gaertner, Remshalden (DE); Thomas Koch, Boeblingen (DE)

(73) Assignee: Daimler AG, Stuttgart (DE)

( * ) Notice: Subject to any disclaimer, the term of this patent is extended or adjusted under 35 U.S.C. 154(b) by 502 days.

(21) Appl. No.: 11/209,717

(22) Filed: Aug. 24, 2005

(65) Prior Publication Data

US 2006/0042466 A1 Mar. 2, 2006

(30) Foreign Application Priority Data

Aug. 26, 2004 (DE) .................... 10 2004 041 263

(51) Int. Cl.
*B01D 53/22* (2006.01)
*F02B 23/00* (2006.01)

(52) U.S. Cl. .................... 95/54; 96/4; 96/10; 55/385.3; 55/342; 55/482; 60/274; 60/280; 123/26; 123/585; 123/198 E

(58) Field of Classification Search ............... 96/4, 96/8, 10; 95/45, 54; 55/282.2, 282.3, 385.3, 55/342, 523, DIG. 5, DIG. 10, DIG. 30, 482; 60/274, 280, 311; 123/198 E, 26, 585
See application file for complete search history.

(56) References Cited

U.S. PATENT DOCUMENTS

| 5,147,417 | A | * | 9/1992 | Nemser ......................... 95/54 |
| 5,517,978 | A | * | 5/1996 | Yi ................................ 123/585 |
| 5,526,641 | A | * | 6/1996 | Sekar et al. .................... 60/274 |
| 5,640,845 | A | * | 6/1997 | Ng et al. ........................ 60/274 |
| 5,649,517 | A | * | 7/1997 | Poola et al. ................... 123/585 |
| 5,960,777 | A | * | 10/1999 | Nemser et al. ............... 123/585 |
| 6,067,973 | A | * | 5/2000 | Chanda et al. ............... 123/585 |
| 6,173,567 | B1 | * | 1/2001 | Poola et al. .................... 123/26 |
| 6,397,825 | B1 | * | 6/2002 | Klomp ......................... 123/585 |
| 6,484,673 | B1 | * | 11/2002 | Davis et al. .................... 123/26 |
| 6,516,787 | B1 | * | 2/2003 | Dutart et al. ................. 123/539 |
| 6,640,794 | B2 | * | 11/2003 | Weber ......................... 55/385.3 |
| 7,100,543 | B2 | * | 9/2006 | Davidson ...................... 123/26 |

* cited by examiner

*Primary Examiner*—Jason M Greene
(74) *Attorney, Agent, or Firm*—Crowell & Moring LLP

(57) ABSTRACT

In an internal combustion engine with an air separation unit and a method of realizing such an internal combustion engine, the air separation unit is able to be fed by intake air compressed by a charging unit and cooled by a charged air cooler. The internal combustion engine can at least periodically be fed with a retentate, provided by the air separation unit, having such a composition that, in comparison to normal, it is oxygen enriched. The air separation unit is connected to the outlet of the charged air cooler, and compressed intake air from the charging unit undergoes purification that includes the separation of fluid and/or solid contents before being fed into the air separation unit.

20 Claims, 4 Drawing Sheets

INTERNAL COMBUSTION ENGINE WITH AN AIR SEPARATOR AND METHODS FOR REALIZING SUCH AN INTERNAL COMBUSTION ENGINE

This application claims the priority of German application 10 2004 041 263.4, filed Aug. 26, 2004, the disclosure of which is expressly incorporated by reference herein.

BACKGROUND AND SUMMARY OF THE INVENTION

The present invention concerns an internal combustion engine with an air separator for the separation of intake air of a composition that, in comparison to normal, is enriched with an oxygen-rich permeate and a nitrogen-rich retentate, and a method for realizing such an internal combustion engine.

An internal combustion engine which can be fed with nitrogen- or oxygen-enriched intake air is known from U.S. Pat. No. 6,173,567 B1. The process of enriching the intake air takes place via the respective air accessories and a membrane separator, which is capable of providing two air supplies, one enriched with the oxygen-rich permeate, the other with the nitrogen-rich retentate. The use of an internal combustion engine alternatively enriched with oxygen-rich and nitrogen-rich intake air enables the reduction of pollutants formed within the engine. Enriching the intake air with nitrogen lowers the combustion temperatures, which leads to a decrease in nitric oxide formation within the combustion space of the internal combustion engine. Enrichment of the intake air reduces soot particle formation within the engine. The amount by which pollutant emissions from the internal combustion engine is reduced, however, is highly dependent on the degree of retentate and/or permeate enrichment and therefore on the separation capacity of the air separation unit. In addition, it is essential that the air separation membrane have a high degree of durability in order to achieve a reliable decrease in pollutant emissions over the lifespan of the internal combustion engine. Considering efficiency requirements in general, it is also desirable to keep additional expenditures to a minimum while demanding as little installation space as possible.

An object of the invention, therefore, is to provide an internal combustion engine with an air separation unit, and a method of realizing such an engine, which can attain improved reliability, increased air separation capacity, and a greater reduction of pollutant emissions.

This object can be achieved by having the air separation unit connected to the outlet of the charged air cooler so that, during operation of the engine, at least one of fluid contents and solid contents is removable from compressed intake air coming from the charging unit during a purification stage before feeding the compressed intake air into the air separation unit.

The internal combustion engine, preferably of diesel engine design, is equipped with a charging unit, for example an exhaust-driven turbo-charger, for the compression of intake air, and a charged air cooler for the cooling of compressed intake air. An air separation unit is envisioned for separating at least a portion of the compressed intake air into a composition that, in comparison to normal, is enriched with an oxygen-rich permeate and a nitrogen-rich retentate. Thus, one or several cylinders of the internal combustion engine can at least periodically be fed with the retentate enriched by the air separation unit. In accordance with the invention, the charged air cooler is connected to the outlet of the charging unit.

The air separator is preferably realized using a membrane separation unit of common design. Employment of a different type of air separation unit, for example one based on the Ranque-Hilsch effect, is also possible. Regardless of the type of air separation unit, the oxygen-enriched outlet air flow will be designated here as the permeate, and the nitrogen-enriched outlet air flow will be designated as the retentate. For the purposes of simplicity, the supply of the permeate and the retentate will in the future be designated as the separated air.

Employment of a comparatively highly nitrogen-enriched retentate is naturally desirable for the reduction of nitric oxide formation within the engine. Given a great enough enrichment, use of exhaust air recycling can if necessary be omitted, resulting in associated cost advantages and a reduction of installation space. The separation capacity of conventional air separation units, however, is heavily dependent on service conditions like working pressure and air flow rate. A rise in air flow rate results in a loss of separation capacity, i.e., the degree of permeate and retentate enrichment as related to the design volume of the air separation unit.

The additional pressure necessary for air separation is accomplished with a charging unit, typically the compressor unit of a turbo-charger installed at the intake side of the air separation unit. If necessary, an additional compression unit can be included. A significant improvement in a high separation capacity of the air separation unit will be occur with a configuration using a charged air cooler according to the invention. One aspect of this concerns the general increase in separation capacity with lower air temperatures; another aspect is that, due to cooling of the compressed air flow, the volumetric air flow is reduced in accordance with the basic gas laws. Therefore, a greatly improved separation capacity can be achieved with the addition of a cooled air flow. As the result of reduced thermal demands, the life expectancy of the air separation unit is increased.

According to the invention, a purification unit may be provided in the circulation path between the charged air cooler and the air separation unit for purification of supplied air. In this way, the air separation unit can be kept free of contaminants, which would otherwise interfere with separation capacity over time. The life expectancy and reliability of the air separation unit will thus be significantly improved.

The purification unit may be designed for removal of fluid and/or solid contents from the air supply. The air fed to the air separation unit can contain contaminants as the direct result of compression. For instance, compressor oil loss can often allow very finely distributed oil droplets to enter the compressed air as contaminants. These will be removed by separation inside the purification unit. To be able also to remove condensed water, the provision of a fluid separator is advantageous. Solid contents will be preferably removed with a fine filter.

One or several cylinders of the internal combustion engine can be at least periodically fed with permeate provided by the air separation unit. The addition of oxygen-enriched intake air will improve combustion within the respective cylinder. This is especially effective in confronting soot formation. The permeate can thus be either mixed with the regular intake air or fed separately.

A compressor unit for the permeate provided by the air separation unit may be used for the supply of at least one cylinder of the internal combustion engine, whereas a separate intake valve is envisioned for each respective engine cylinder or respective cylinders being fed by the permeate. The oxygen-enriched permeate will in this embodiment be compressed to an appropriate pressure that is significantly greater than the peak cylinder pressure and its injection into the combustion chamber through the separate intake valves preferably synchronized. Preferable injection can optimize the soot-reducing effect of adding the permeate.

An air separation unit of the invention may have multiple air separation modules. The separation capacity of the air separation unit can be varied via an adjustable air supplier for the air separation modules. In this way, the amount of air being fed through the air separation unit can conform to varying requirements. In the event that a high enrichment of the intake air with retentate is anticipated, for example, selector valves will send intake air to all available air separation modules in order to achieve the maximum separation capacity. Alternatively, selector elements will enable some or all of the separation modules to be removed from the intake air flow. In the latter case, the air separation unit will be bypassed.

An exhaust gas purification unit, in particular an exhaust particle filter, can be provided with permeate from the internal combustion engine's air separation unit. Instead of ejecting the permeate provided by the air separation unit into the surrounding atmosphere, it can be directed to the exhaust system and there used to advantage in exhaust gas purification. In this way, soot burn-off from a particle filter can for instance be assisted, or other oxidizing exhaust gas purification functions supported.

In a method according to the invention, the internal combustion engine will be equipped with a charging unit that compresses intake air, which is then directed into an air separation unit. The air separation unit makes available intake air of a composition that, in comparison to normal, is enriched with an oxygen-rich permeate and a nitrogen-rich retentate. One or several cylinders of the internal combustion engine will at least periodically be fed with the retentate provided by the air separation unit, whereas the intake air compressed by the charger unit undergoes a purification stage prior to entering the air separation unit which involves the removal of fluid and/or solid contents. A method according to the invention enables a combustion process with reduced nitric oxide formation via the addition of intake air that possesses an oxygen content lower in comparison to normal atmospheric air. The long service life and idle periods required of the air separation unit, particularly in motor vehicles with high mileage, will be achieved by purifying the intake air entering the air separation unit. The purification act or step is preferably accomplished by thoroughly removing as many fluid and solid contents as possible from the intake air directly prior to its entry into the air separation unit. An appropriate filter unit or separator can be envisioned for this purpose. This enables the use of sensitive air separation materials, which can result in corresponding cost advantages.

An embodiment of the method presents the option of adding either all of the intake air compressed by the charging unit or only a limited portion of that intake air into the air separation unit. Flow selection devices like shut-off valves or flow dividers preferably adjust the portion of air entering air separation unit. It can be advantageous if only a limited nitrogen enrichment takes place, especially during partial or low engine loads. The portion of intake air that is to undergo separation can for instance be determined with a load-r.p.m. engine map. An optimal separation of the intake air can thus be attained.

Re-compressed permeate provided by the air separation unit can be added into at least one of the cylinders of the internal combustion engine after the peak of combustion and at a pressure greater than the peak cylinder pressure. Soot formation in particular will be suppressed by the increased oxygen content. Since the addition of the permeate takes place as the combustion is dying off, an increase in nitric oxide formation in the combustion chamber will be avoided, particularly when the subsequent addition of intake air is to be enriched with nitrogen. In this manner both soot emissions and nitric oxide emissions can be diminished. It is especially advantageous that the permeate is being blown into the cylinder at a pressure as high as or higher than approximately twice the pressure inside the cylinder. The resulting turbulence is especially effective at improving the oxidation of soot-forming nuclei, so that an especially effective reduction of soot emission can be achieved.

The permeate provided by the air separation unit can be combined with a regeneration process for a particle filter installed in the exhaust system of the internal combustion engine. The permeate will be fed into the exhaust system upstream from the particle filter. The increased oxygen content of the exhaust will improve the soot burn-off from the particle filter, thus keeping the exhaust temperature increase necessary for particle filter regeneration comparatively low. This significantly assists the process of particle filter regeneration.

Advantageous embodiments of the invention are illustrated in the drawing figures and will subsequently be described. Both the features previously referred to as well as those to be subsequently explained are thus applicable not only in the respectively described combinations but also in other combinations, as well as uniquely, without departing from the framework of the invention at hand.

DETAILED DESCRIPTION OF THE INVENTION

Figure 1:
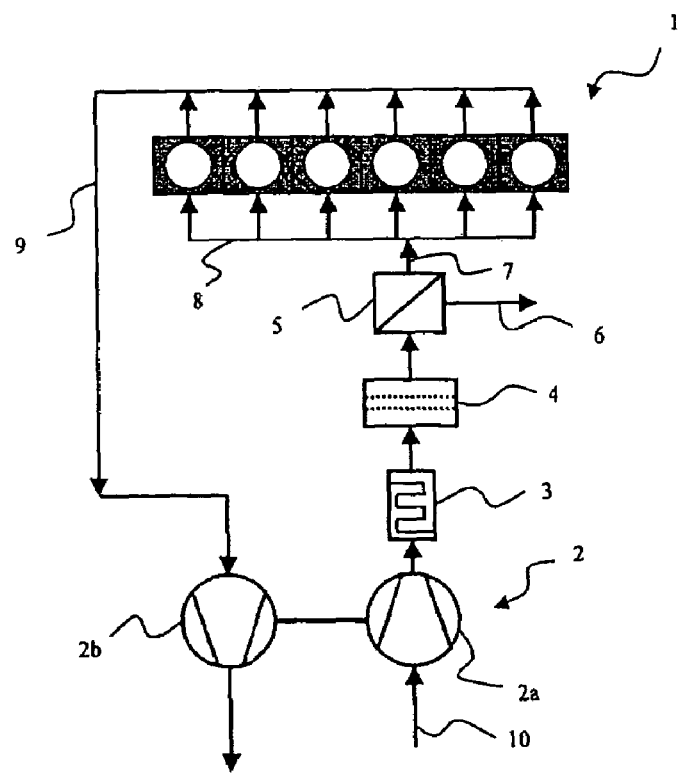
FIG. 1 is a schematic depiction of a first advantageous embodiment of an internal combustion engine according to the invention.

FIG. 1 is a schematic block diagram of a first advantageous embodiment of the internal combustion engine according to the invention. This comprises a six-cylinder straight block type air compressing combustion engine 1. The engine 1 is equipped with an exhaust gas turbo-charger 2 with a turbine 2b inside an exhaust gas line 9 and a compressor 2a in an air intake line 10. A charged air cooler 3 is connected to the outlet of the compressor 2a for cooling compressed intake air. Further, in the air flow of the already compressed and cooled intake air is arranged a purification unit 4, which enables the purification of compressed intake air. Connected to the outlet of the purification unit 4 is an air separation unit 5, which makes available an oxygen-enriched permeate through a permeate outlet 6 and a nitrogen-enriched retentate through a retentate outlet 7. The retentate outlet 7 of the air separation unit 5 is joined to the intake manifold 8 of the engine 1. The retentate provided by the air separation unit is added through the intake manifold 8, into the cylinders of the engine 1 as combustion air.

Operation of the internal combustion engine according to the invention will subsequently be explained with reference to FIG. 1.

During normal operations of the engine 1 the cylinders will be fed, respectively, combustion air through an intake valve, and fuel through a special injector. The mixture is then ignited. Undesirable pollutants are produced during the fuel combustion, for example nitric oxide and soot. Formation of nitric oxide increases with rising combustion temperature, while soot formation is the result of an incomplete course of combustion. The pollutants will be ejected along with the other combustion exhaust gases through an exhaust valve and directed through a common exhaust gas line 9. The cylinder head here is of the usual and appropriate design and is equipped with injectors as well as intake and exhaust valves and is not depicted in further detail. Special exhaust gas purification devices, for instance a catalytic converter or a particle filter, can be installed in the exhaust gas line 9 for the post-engine removal of pollutants, which are likewise not depicted in FIG. 1.

Charging of the cylinder will be enhanced for improved engine performance by initially compressing the air directed through the intake manifold 10 with the compressor 2a of the exhaust turbo-charger 2. Thus, the turbine 2b is driven by the exhausted combustion gases of the engine 1. The exhaust turbo-charger 2 is of the usual appropriate design and can be constructed, for instance, as a waste-gate charger or as a turbo-charger. However, compression can also be realized using another appropriate accessory, such as a mechanically-driven compressor. Compression typically happens at several bar above atmospheric pressure. The compressed intake air will be further directed through the charged air cooler, where the intake air heated by compression will be cooled to a suitable temperature of less than about 50 degrees C.

In order to minimize combustion temperatures, and thereby nitric oxide formation, the oxygen content of the combustion air can be lowered and/or the nitrogen content of the combustion air can be raised, for instance by mixing the exhaust gases from the combustion air through an exhaust gas recycling line. Although this can be envisioned for the internal combustion engine depicted in FIG. 1, exhaust gas recycling is preferably omitted, with the pre-combustion air being nitrogen-enriched with the air provided by the separation unit 5. This is preferably designed for the separation of the entire air flow feeding the engine 1, and is correspondingly installed in the intake line supplying combustion air. The air separation element can be of any design. It will subsequently be assumed that the air separation unit 5 is designed as a so-called membrane separation device of common design. The air separation takes place in such a way that an oxygen-enriched permeate air flow and a nitrogen-enriched retentate air flow will be produced. Thus, the retentate air flow provided typically comprises about 95 percent of the intake air flow. The nitrogen-enriched retentate air flow will be fed through the retentate outlet 7 of the air separation unit 5 and the intake manifold 8 of the engine, and thus added as combustion air. The oxygen-enriched permeate flow will be directed into the atmospheric air through a permeate outlet 6.

Depending on service requirements, the nitrogen content of the retentate flow can be raised well over 80 percent. The degree of enrichment, in other words the separation capacity, thus increases by raising the pressure of the air supply. So, the air separation unit is connected downstream of the compressor 2a and receives compressed intake air supplied by the compressor 2a. The pressure developed by the compressor 2a in question will thus be utilized in an advantageous manner. The compressor 2a will preferably be constructed to achieve the highest possible compression ratio over a wide service load range of engine 1. The compressor 2a preferably supplies intake air with a pressure of more than about three bar above atmospheric. However, a further increase in pressure can be envisioned via an additional compression step using a pump or a mechanical compressor, which is not depicted in FIG. 1.

The degree of enrichment, in other words the separation capacity, of the air separation unit 5 typically drops with a rise in air flow volume. This undesirable phenomenon will be countered according to the invention by installing an air separation unit 5 downstream of the charged air cooler 3 and supplying it with cooled intake air. As a result of the cooling from the charged air cooler 3, the volumetric flow of the compressed intake air is accordingly decreased relative to the volumetric flow immediately after the compressor 2a. The separation capacity of the air separation unit is thus accordingly improved. Conversely, a smaller air separation unit 5 can be employed for the separation capacity in question.

A disadvantage of common membrane separation devices lies in their often insufficient durability and/or their degenerating separation capacity over time, which has up until now hindered their employment in utility motor vehicles with high mileage. The temperature burden on the air separation unit 5, however, is substantially improved by its installed location after the charged air cooler 3, according to the invention. As a result, the reliability and durability of the air separation unit 5 are improved.

Although an undepicted air filter for the internal combustion engine is envisioned, which would be connected before the compressor component 2a of the turbo-charger 2, it could well be determined that an additional purification of the air fed to the air separation unit 5 greatly improves the durability of the air separation unit 5 as well as stabilizing its sustained separation capacity. Therefore, according to the invention, a purification unit 4 is preferably connected immediately prior to the air separation unit 5. This also serves primarily to separate the finest fluid and/or solid particles floating in the compressed and cooled intake air. The air purification unit 4 consists primarily of a fine-pored air filter. Particularly advantageous is an air purification unit of coalescing filter or coalescing and membrane filter design. The coalescing filter is preferably hydrophobic and/or oleophobic, retains all particles, and continuously separates fluid droplets such as condensed water droplets.

Although most turbo-chargers exhibit only minimal oil loss, it could well be determined that this oil loss, discharged as a fine oil mist, has an especially harmful effect on the air separation unit 5. Thus, the purification unit 4 is arranged downstream of the charging unit 2a of the turbo-charger 2. In this way, this oil mist can be removed from the compressed intake air and kept away from air separation unit 5. It is especially preferable to arrange the air purification unit 4 downstream of the charged air cooler 3, but before the air separation unit 5, as depicted in FIG. 1.

Long service periods are thus made possible through the design and operation according to the invention of low-emission fuel-air combustion in the cylinders of the engine 1.

Figure 2:
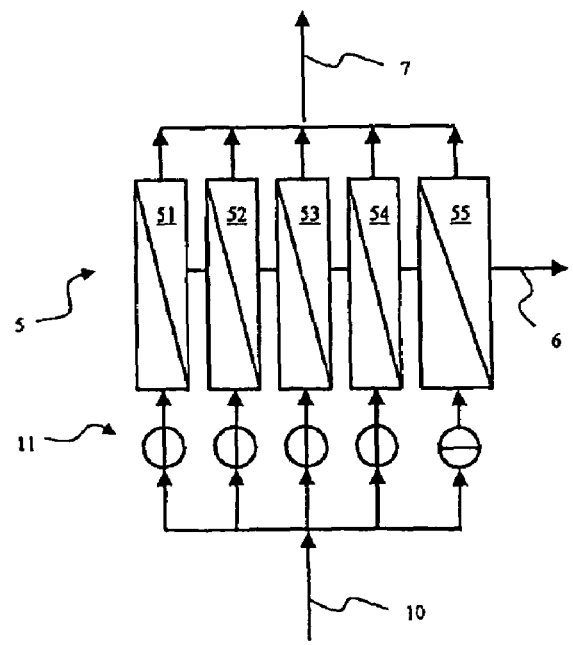
FIG. 2 is a schematic depiction of an advantageous embodiment of an air separation unit for the internal combustion engine according to the invention.
Figure 3:
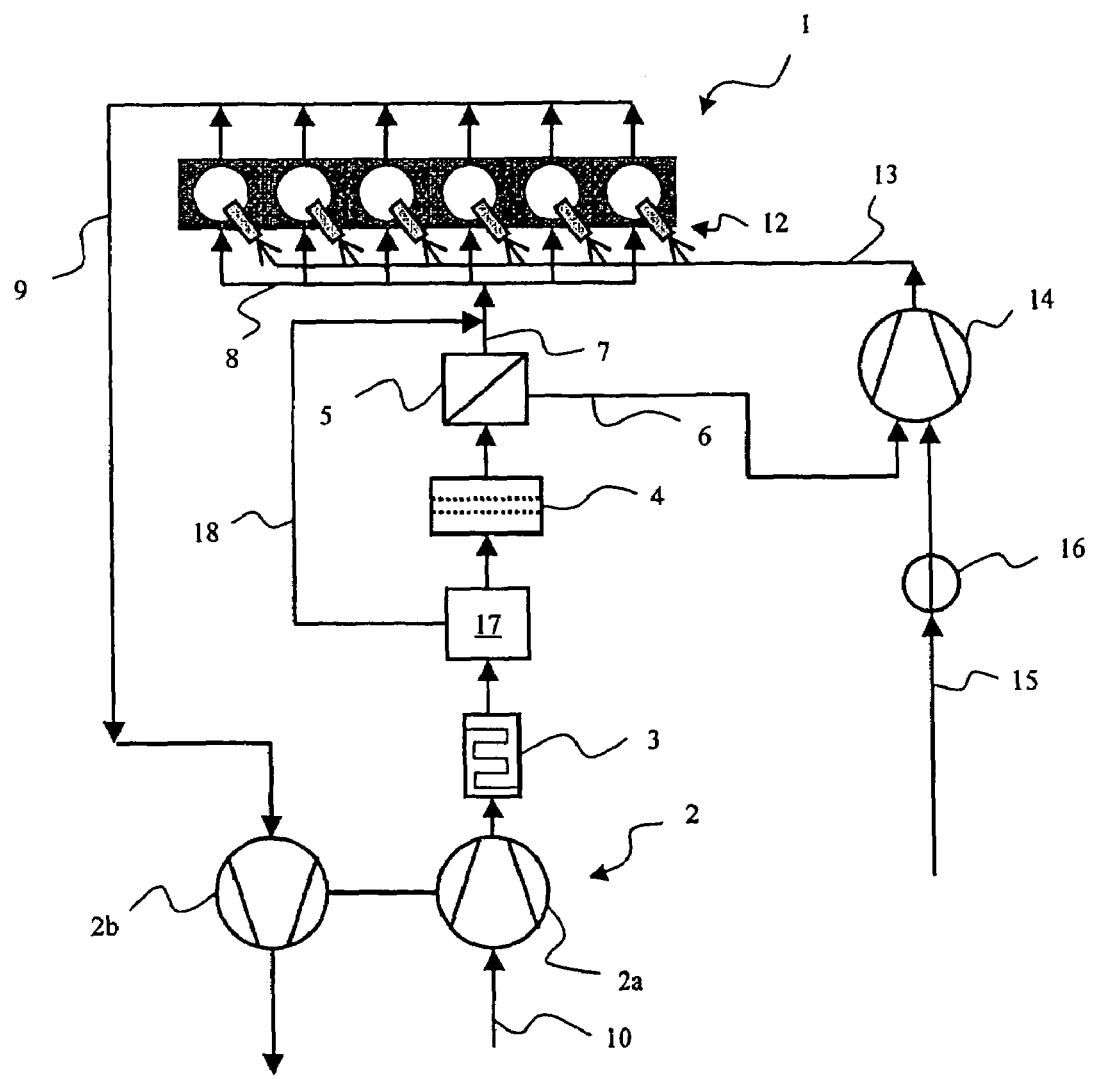
FIG. 3 is a schematic depiction of a second advantageous embodiment of an internal combustion engine according to the invention.

Particularly during relatively low engine loads, it can be advantageous to operate the engine 1 with combustion air that exhibits only a comparatively low degree of nitrogen enrichment. In this case, an air separation unit 5 may be designed with multiple, individual, and appropriately varying air separation modules, which can be individually selected open and closed by using selector elements. In FIG. 2, for example, the air separation unit 5 is designed with five individual air separation modules 51 to 55, whereby air separation module 55 is larger than the other air separation modules 51 to 54. Each air separation module is thereby dedicated to a selector valve 11. The compressed, cooled and purified intake air fed to the air separation unit 5 through the air line 10 can thus be distributed among the air separation modules 51 to 55. The separation capacity can in this way be adjusted and/or lessened according to need. As shown in FIG. 2, the air separation modules 51 to 54 dedicated to the selector valves 11 are selected open. Since the air separation module 55 dedicated to selector valve 11 is, in contrast, closed, air separation module 55 is removed from the air supply. Thus, only the air separation modules 51 to 54 are being supplied with intake air and separate the air fed to them. The corresponding retentate streams will be directed through the common retentate outlet 7 and fed to the engine 1 as above. The analogous permeate streams will be directed through the permeate outlet 6. FIG. 3 depicts a second advantageous embodiment of the internal combustion engine according to the invention. To the extent that they are in accordance with those depicted in the first embodiment of FIG. 1, the individual components are indicated with the same reference symbols. The internal combustion engine of FIG. 2 is of similar design and will be operated similarly to the internal combustion engine depicted in FIG. 1. For this reason only the resulting differences will be addressed.

FIG. 3 displays an internal combustion engine with an air controlling element 17 in the air line 10, which is envisioned using flow divider design and is connected to the inlet of the air separation unit 5. By means of the flow divider 17, the intake air flow can be split up so that an allotted portion of the compressed intake air will be fed to the air separation unit 5, while the rest will be directed around the air separation unit 5 through a bypass line 18. As depicted, the flow divider 17 is preferably connected along the air line 10 between the charged air cooler 3 and the air purification unit 4; the bypass line 18 discharges after the air separation unit 5. In this way, the degree of nitrogen enrichment of the intake air fed into the engine 1 is allowed to be adjusted and/or lessened according to need so that only an allotted portion of the intake air undergoes separation.

An additional substantial difference concerns the utilization of the permeate made available by the air separation unit. In the embodiment depicted in FIG. 3 it is envisioned that it will be re-compressed through a compression unit 14 and blown into the cylinders through the respectively dedicated inlet valves 12. The permeate outlet 6 of the air separation unit 5 is correspondingly attached to the inlet of the compression unit 14. An air collector line 13 for supplying the cylinders with re-compressed permeate is attached to the outlet of the compression unit, and the inlet valves 12 are for their part each connected to the air collector line 13.

The inlet valves 12 are individually timed and controlled independently of one another for the synchronized injection of compressed permeate into a given cylinder. It is anticipated that the permeate will be injected into a respective cylinder just after the peak of combustion, in other words during a given time period within the expansion stage. A permeate injection in the range of 0 and 50 cylinder degrees after top dead center is especially preferable. In this way the respective cylinder is fed oxygen-enriched air during the late stage of combustion, so that soot particles will be oxidized and soot formation thereby effectively diminished. The effect of reducing soot formation can be even more greatly enhanced if the compression of the injected air is sufficiently great. A preferable compression of the air takes place at about twice the maximum cylinder pressure. A re-compression using the compression unit 14 is preferable at a pressure enabling injection at sonic speed. The resulting turbulence that is created is especially effective at reducing soot formation within the engine.

One envisioned option can be that of injecting compressed atmospheric air into the cylinders instead of or in addition to the permeate. In FIG. 3, parallel to the permeate outlet 6, a compression air line 15 connected to the inlet side of the compression unit 14 through an air control valve 16 is depicted for this purpose. In this way the amount of additional injected air in particular can be elevated. It is envisioned that the degree of oxygen enrichment or the amount of additional air injected through the intake valves 12 will be adjusted, for instance, by the means of an air control valve 16.

Figure 4:
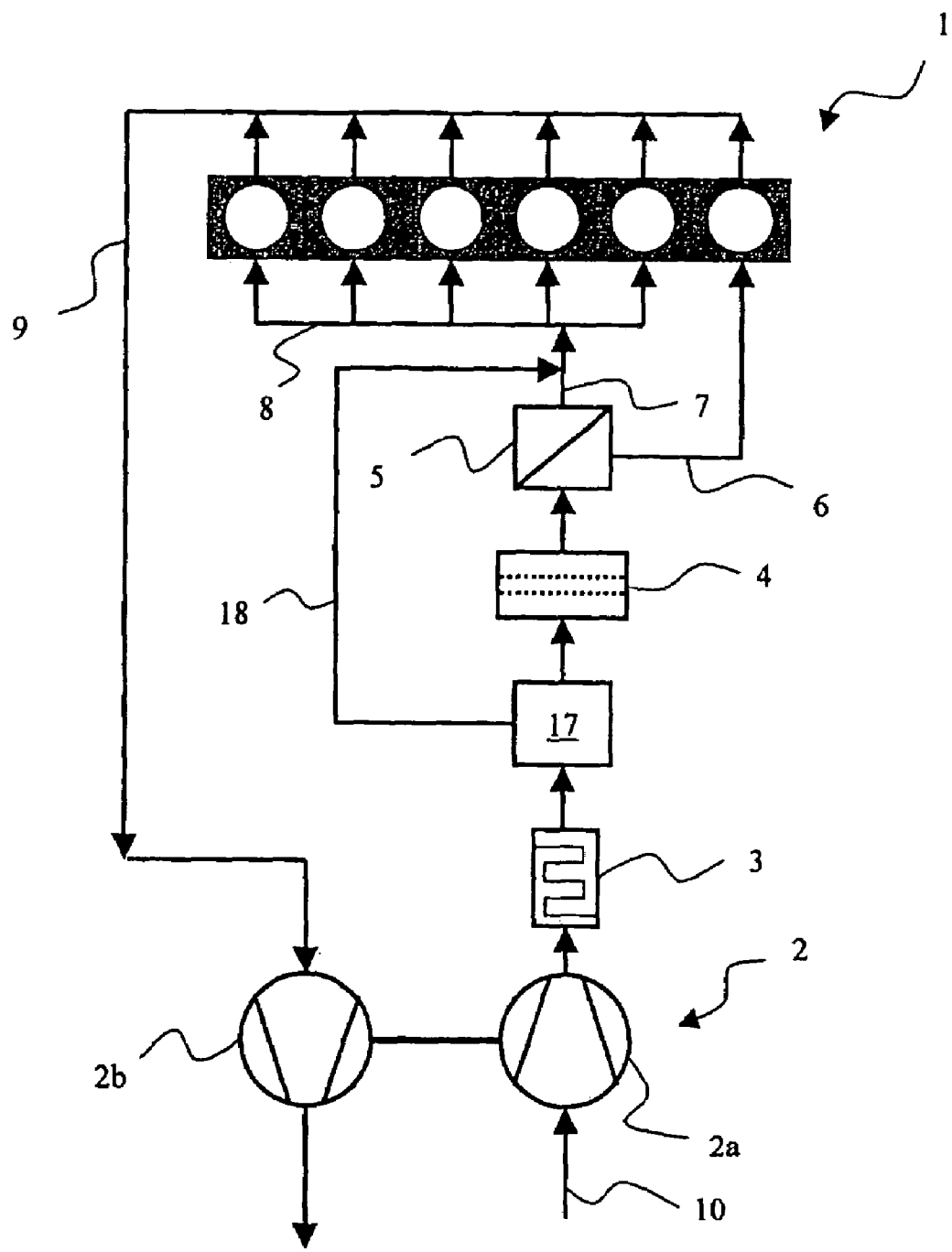
FIG. 4 is a schematic depiction of a third advantageous embodiment of an internal combustion engine according to the invention.

In FIG. 4, a third advantageous embodiment of the internal combustion engine according to the invention is depicted. To the extent that they are in accordance with those depicted in the embodiments of FIGS. 1 and 3, the individual components are indicated with the same reference symbols. The internal combustion engine of FIG. 4 is of similar design and will be operated similarly to the internal combustion engines depicted in FIGS. 1 and 3, as the case may be. For this reason only the ensuing differences will be addressed. These concern the fact that some of the cylinders of the engine 1 will be supplied with nitrogen-enriched air, while other cylinders are supplied with oxygen-enriched intake air for combustion. The retentate outlet 7 and the permeate outlet 6 of the air separation unit are thus preferably connected to different cylinders. The aggregate nitric oxide and soot emissions resulting from this embodiment are also minimal in that some of the cylinders' operation will then be optimized with regard to nitric oxide emissions and the other cylinders' operation will be optimized with regard to soot emissions.

Figure 5:
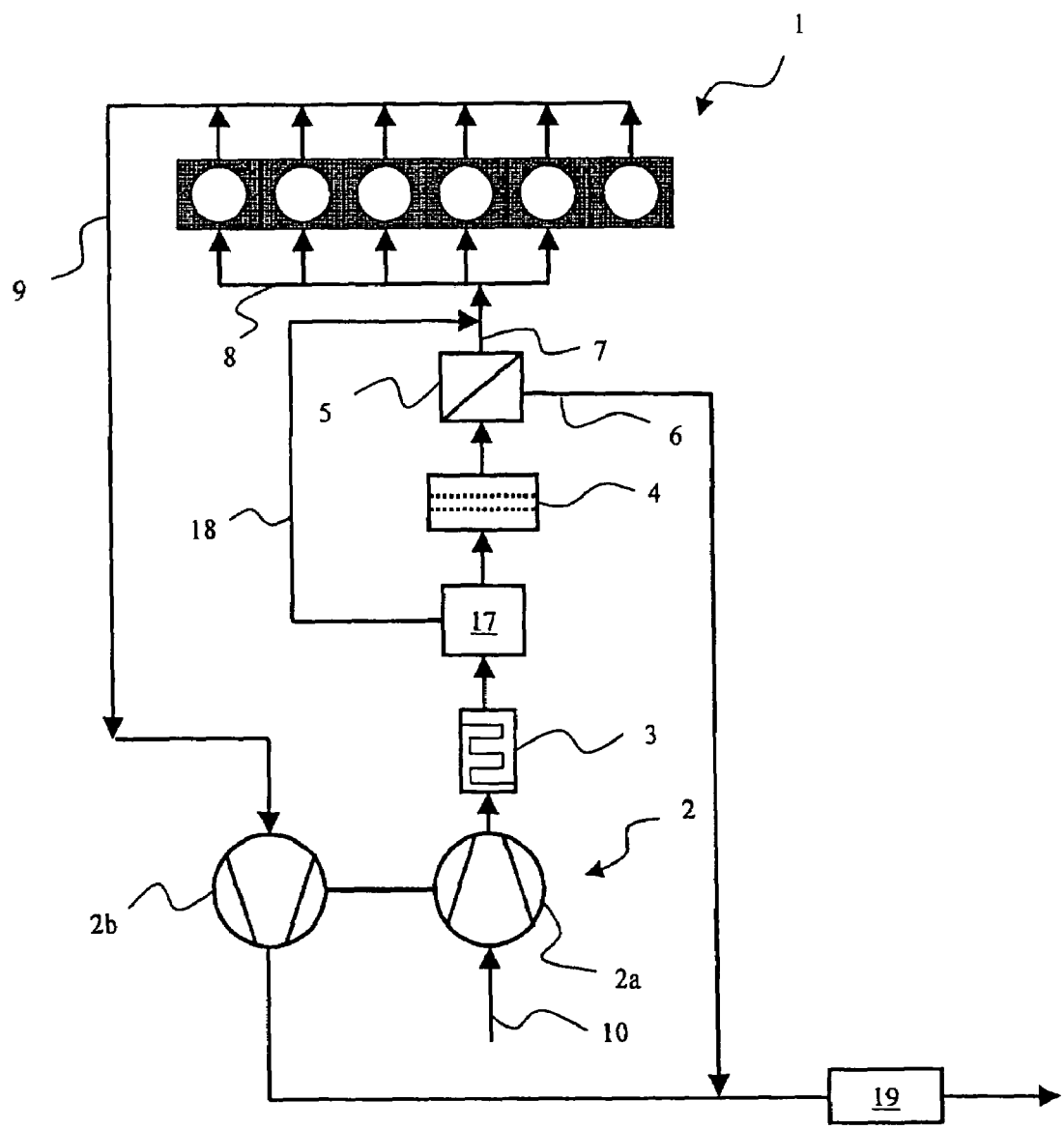
FIG. 5 is a schematic depiction of a fourth advantageous embodiment of an internal combustion engine according to the invention.

In FIG. 5, a fourth advantageous embodiment of the internal combustion engine according to the invention is depicted. To the extent that they are in accordance with those depicted in the embodiments of FIGS. 1, 3, and 4 the individual components are indicated with the same reference symbols. The internal combustion engine of FIG. 5 is of similar design and will be operated similarly to the internal combustion engines depicted in FIGS. 1, 3, and 4, as the case may be. For this reason only the ensuing differences will be addressed.

Arranged in the exhaust gas line 9 of the internal combustion engine 1 is a particle filter capable of regeneration through thermal soot burn-off. This can be of the usual design, for instance a so-called wallflow filter or sintered metal type filter. Over time, the soot filtered out of the exhaust accumulates in the particle filter 19, which can eventually lead to a decreasingly tolerable rise in back-pressure. The particle filter 19 will thus preferably undergo a well-known regeneration procedure involving an increase in exhaust gas temperatures, by which the accumulated soot will be burned off. This regeneration process will be facilitated by feeding oxygen-rich exhaust gas into the filter, so that the increase in exhaust gas temperature will be lower than would be the case by omitting the measure. An increase of 550 degrees C. can already be sufficient, for which reason the operating range of the engine during which the regeneration process becomes feasible is substantially expanded. In addition, the regeneration process is less energy-intensive. The enrichment of the exhaust gases in the internal combustion engine happens in a simple fashion, according to the invention, in that the permeate outlet 6 of the air separation unit will be joined to the exhaust gas line 9 so that permeate can be added upstream of the particle filter 19 of the exhaust gas line 9. An increase in exhaust gas temperatures can also be envisioned with the use of a burner, whereby it is advantageous to feed the burner with permeate.

An undepicted selector element can of course be envisioned which enables a permeate flow in combination with particle filter regeneration only to feed to the exhaust gas line 9, otherwise directing it into the atmosphere or feeding it into the internal combustion engine. Further, additional exhaust purification units can be arranged inside the exhaust gas line 9, for example an oxidizing catalytic converter, which is likewise not specifically depicted. The permeate provided by the air separation unit 5 can then be preferably fed into the intake of this catalytic converter, for instance toward improving the starting process or for increasing catalytic turnover in the exhaust gas line during low temperatures. This is particularly advantageous when an oxidizing catalytic converter is connected to the outlet of the particle filter 19. In this case, the nitrogen monoxide contained in the exhaust gas can be very effectively oxidized to nitrogen dioxide. The nitrogen dioxide formed can already oxidize the deposited soot on the succeeding particle filter 19 at relatively low temperatures. Particle filter regeneration using thermal soot burn-off can be performed less often, or can be omitted entirely.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A multiple-cylinder, air compressing internal combustion motor vehicle engine, comprising:
    a charging unit for compression of intake air,
    a charged air cooler connected to the outlet of the charging unit for cooling of compressed intake air,
    an air separation unit for separation of the intake air compressed by the charging unit into an oxygen-rich permeate with an air composition that, in comparison to normal, is oxygen-enriched, and a nitrogen-rich retentate, and
    a purification unit arranged in an air flow downstream of the charged air cooler and immediately prior to the air separation unit so as to remove oil mist from the compressed air prior to supply of the compressed air to the air separation unit,
    wherein at least one cylinder of the internal combustion engine can at least periodically be fed with the retentate provided by the air separation unit, and
    wherein the air separation unit is connected to the outlet of the charged air cooler.

2. The internal combustion engine according to claim 1, wherein the purification unit is constructed for removal of solid contents and/or fluid other than said oil mist from the air flow.

3. The internal combustion engine according to claim 1, wherein at least one cylinder of the internal combustion engine is at least periodically able to be fed with the permeate provided by the air separation unit.

4. The internal combustion engine according to claim 2, wherein at least one cylinder of the internal combustion engine is at least periodically able to be fed with the permeate provided by the air separation unit.

5. The internal combustion engine according to claim 4, wherein a compressor unit is provided for the permeate provided by the air separation unit, wherein at least one cylinder of the internal combustion engine is able to be fed by the compressed permeate, and wherein a separate inlet valve is provided for each respective cylinder to be fed with the permeate.

6. The internal combustion engine according to claim 1, wherein the air separation unit has multiple air separation modules, and wherein a separation capacity of the air separation unit can be varied with an adjustable air supplier for the air separation modules.

7. The internal combustion engine according to claim 3, wherein the air separation unit has multiple air separation modules, and wherein a separation capacity of the air separation unit can be varied with an adjustable air supplier for the air separation modules.

8. The internal combustion engine according to claim 5, wherein the air separation unit has multiple air separation modules, and wherein a separation capacity of the air separation unit can be varied with an adjustable air supplier for the air separation modules.

9. The internal combustion engine according to claim 1, further comprising an exhaust gas particle filter that can be fed with the permeate provided by the air separation unit.

10. The internal combustion engine according to claim 3, further comprising an exhaust gas particle filter that can be fed with the permeate provided by the air separation unit.

11. The internal combustion engine according to claim 5, further comprising an exhaust gas particle filter that can be fed with the permeate provided by the air separation unit.

12. The internal combustion engine according to claim 6, further comprising an exhaust gas particle filter that can be fed with the permeate provided by the air separation unit.

13. A method for operating a multiple cylinder internal combustion engine including a charging unit installed on the internal combustion engine that will compress intake air to be fed into an air separation unit, comprising:
    providing a permeate having an air composition that, in comparison to normal, is enriched with oxygen, and a nitrogen-rich retentate, by way of the air separation unit,
    at least periodically feeding at least one cylinder of the internal combustion engine by retentate provided by the air separation unit, and
    removing oil mist from compressed intake air coming from the charging unit by way of a purification unit arranged in an air flow downstream of the charging unit and immediately prior to the air separation unit.

14. The method according to claim 13, wherein the air separation unit can optionally be fed with all of the compressed air or an allotted portion of the compressed air from the charging unit.

15. The method according to claim 13, and further comprising recompressing the permeate provided by the air separation unit at a pressure higher than a maximum cylinder pressure and injecting the permeate into at least one cylinder during a work cycle just after a peak of combustion.

16. The method according to claim 14, and further comprising recompressing the permeate provided by the air separation unit at a pressure higher than a maximum cylinder pressure and injecting the permeate into at least one cylinder during a work cycle just after a peak of combustion.

17. The method according to claim 13, and further comprising initiating a regeneration procedure using permeate flow from the air separation unit in combination with a particle filter arranged inside the exhaust gas system of the internal combustion engine upstream of the particle filter.

18. The method according to claim 14, and further comprising initiating a regeneration procedure using permeate flow from the air separation unit in combination with a particle filter arranged inside the exhaust gas system of the internal combustion engine upstream of the particle filter.

19. The method according to claim 15, and further comprising initiating a regeneration procedure using permeate flow from the air separation unit in combination with a particle filter arranged inside the exhaust gas system of the internal combustion engine upstream of the particle filter.

20. The method according to claim 16, and further comprising initiating a regeneration procedure using permeate flow from the air separation unit in combination with a particle filter arranged inside the exhaust gas system of the internal combustion engine upstream of the particle filter.

* * * * *